(12) United States Patent
Ruebsamen et al.

(10) Patent No.: US 7,182,188 B2
(45) Date of Patent: Feb. 27, 2007

(54) ISOLATOR USING EXTERNALLY PRESSURIZED SEALING BELLOWS

(75) Inventors: Dale T. Ruebsamen, Glendale, AZ (US); James H. Boyd, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 45 days.

(21) Appl. No.: 11/059,054

(22) Filed: Feb. 16, 2005

(65) Prior Publication Data

US 2006/0180417 A1  Aug. 17, 2006

(51) Int. Cl.
  *F16F 9/04* (2006.01)
  *F16F 9/08* (2006.01)
(52) U.S. Cl. .................................. 188/298; 188/322.5
(58) Field of Classification Search ................ 188/280, 188/297, 322.5, 298
  See application file for complete search history.

(56) References Cited

U.S. PATENT DOCUMENTS

| | | | |
|---|---|---|---|
| 3,469,661 A | 9/1969 | Hoffmann et al. | |
| 4,572,488 A | 2/1986 | Holmberg, Jr. et al. | |
| 4,760,996 A | 8/1988 | Davis | |
| 4,815,574 A * | 3/1989 | Taylor et al. | 188/280 |
| 5,219,051 A | 6/1993 | Davis | |
| 5,249,783 A | 10/1993 | Davis | |
| 5,305,981 A | 4/1994 | Cunningham et al. | |
| 5,318,156 A | 6/1994 | Davis | |
| 5,332,070 A * | 7/1994 | Davis et al. | 188/298 |
| 5,803,213 A | 9/1998 | Davis et al. | |
| 5,918,865 A | 7/1999 | Osterberg | |
| 5,947,240 A | 9/1999 | Davis et al. | |
| 5,979,882 A | 11/1999 | Osterberg | |
| 5,992,584 A | 11/1999 | Moody | |
| 6,003,849 A | 12/1999 | Davis et al. | |
| 6,082,508 A | 7/2000 | Davis | |

(Continued)

FOREIGN PATENT DOCUMENTS

EP  0 539 930 A1  5/1993

(Continued)

OTHER PUBLICATIONS

PCT International Search Report PCT/US2006/004342, May 12, 2006.

*Primary Examiner*—Devon Kramer
(74) *Attorney, Agent, or Firm*—Ingrassia Fisher & Lorenz

(57) ABSTRACT

Apparatus are provided for a damping system. The system includes a housing having an inner surface defining a passage therethrough, a first bellows disposed within the passage, the first bellows having an outer surface and spaced apart from the housing inner surface to define a first chamber having a volume, a second bellows disposed within the passage, the second bellows having an outer surface and spaced apart from the housing inner surface to define a second chamber having a volume, a restrictive flow passage in fluid communication with the first and second chambers, fluid disposed within the first chamber, the second chamber, and the restrictive flow passage, and a piston coupled to the second bellows and disposed at least partially within the restrictive flow passage, the piston configured to selectively receive a force to thereby move the piston through the housing passage.

15 Claims, 4 Drawing Sheets

U.S. PATENT DOCUMENTS

| | | |
|---|---|---|
| 6,129,185 A | 10/2000 | Osterberg et al. |
| 6,265,741 B1 | 7/2001 | Schrems |
| 6,354,576 B1 | 3/2002 | Jacobs et al. |
| 6,390,254 B1 | 5/2002 | Bennett et al. |
| 6,715,591 B2 | 4/2004 | Davis |
| 6,896,109 B2 * | 5/2005 | Kelso et al. ............. 188/267.1 |

FOREIGN PATENT DOCUMENTS

| | | |
|---|---|---|
| FR | 642 711 | 9/1928 |
| GB | 658 532 | 10/1951 |
| GB | 1 175 255 | 12/1969 |
| GB | 1 569 157 | 6/1980 |

* cited by examiner

ISOLATOR USING EXTERNALLY PRESSURIZED SEALING BELLOWS

FIELD OF THE INVENTION

The present invention generally relates to vibration damping and isolation systems, and more particularly relates to isolators.

BACKGROUND OF THE INVENTION

A precision pointing system carrying a sensor, such as a telescope as its payload, may be susceptible to disturbances that produce structural vibrations and, consequently, pointing errors. Such vibrations may be attributed to mechanical components or assemblies, such as reaction wheel assemblies that are used as actuators in the precision pointing system. For the most part, because these systems tend not to have significant, inherent damping, these structural vibrations may degrade system performance and even cause structural fatigue over time. Therefore, an efficient means of providing damping and isolation to the system may be needed.

Typically, to minimize performance degradation caused by vibrations, a passive-mass damping and isolation system is used for damping the structure and isolating the payload carried by a precision isolation system. One example of a passive-mass damping and isolation system is the D-STRUT® isolation strut, manufactured by Honeywell, Inc. of Morristown, N.J. The D-STRUT® isolation strut is a three-parameter vibration isolation system that mechanically acts like a spring ($K_A$) in parallel with a series spring ($K_B$) and damper ($C_A$) and is disclosed in U.S. Pat. No. 5,332,070 entitled "Three Parameter Viscous Damper and Isolator" by Davis et al. This patent is hereby incorporated by reference.

The D-STRUT® isolation strut includes a hollow shaft and a piston that is configured to slidably move through the shaft. The piston includes a flange that extends radially from a midsection thereof. The flange has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other.

Although the D-STRUT® isolation strut operates effectively in most applications, it may not be appropriate to implement in other applications. For example, in circumstances in which a space constraint includes the need for an elongated isolation strut, lengthening the first and second sealed bellows to accommodate such a space constraint may present certain drawbacks. In particular, if one of the first and/or second sealed bellows is too long, it may experience column buckling when force is applied to the piston. As a result, the amount of force applied to the piston may need to be decreased to avoid column buckling of either the first and/or second sealed bellows; thus, the isolation strut may not be able to damp vibration of relatively large payloads. In another example, an apparatus may already implement the D-STRUT® isolation strut; however, there may be a desire to replace the strut with one that has an increased payload capacity. In such cases, complicated and more costly configurations are typically employed.

Accordingly, it is desirable to have an isolation strut that is capable of damping and isolating vibration of relatively large payloads without experiencing column buckling either the first and/or second sealed bellows. In addition, it is desirable for the isolation strut to be usable in any type of space constraint. Moreover, it is desirable for the isolation strut to have a simple configuration that is relatively inexpensive to implement. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for vibration and damping and isolation. In one exemplary embodiment, the apparatus comprises a housing, a first bellows, a second bellows, a restrictive flow passage, fluid, and a piston. The housing has an inner surface defining a passage therethrough. The first bellows is disposed within the housing passage and has an outer surface spaced apart from the housing inner surface to define a first chamber having a volume. The second bellows is disposed within the housing passage and has an outer surface spaced apart from the housing inner surface to define a second chamber having a volume. The restrictive flow passage is in fluid communication with the first and second chambers. Fluid is disposed within the first chamber, the second chamber, and the restrictive flow passage. The piston is coupled to at least the second bellows and disposed at least partially within the restrictive flow passage. The piston is configured to selectively receive a force to thereby move the piston through the housing passage to increase the first chamber volume and decrease the second chamber volume or to decrease the first chamber volume and increase the second chamber volume.

In another exemplary embodiment, the apparatus includes a housing, a first bellows, a second bellows, a piston, and fluid. The housing has a first end, a second end, an inner surface, and a passage defined by the inner surface extending between the first and second ends. The first bellows is disposed within the housing passage and has a first end, a second end, and an outer surface. The first bellows first end is coupled to the housing first end, and the first bellows second end has a surface. The first bellows outer surface and housing inner surface define a first chamber having a volume. The second bellows is disposed within the housing passage and has a first end, a second end, an inner surface, and an outer surface. The second bellows first end is coupled to the housing second end, the second bellows inner surface defines a cavity therein, and the second bellows outer surface and housing inner surface defining a second chamber having a volume. The piston is disposed within the housing passage, and has a shaft having a first section, a second section and an outer surface. The shaft first section is at least partially disposed in the second bellows cavity, the shaft second section is at least partially disposed outside of the second bellows cavity and defines a flowpath with the housing inner surface. The flowpath is in fluid communication between the first and second chambers, and at least a portion of the shaft outer surface between the first and second sections is coupled to the second bellows second end. The piston is configured to selectively receive a force to thereby move the piston through the housing passage to increase the first chamber volume and decrease the second chamber volume or to decrease the first chamber volume and increase the second chamber volume. The fluid is disposed at least within the first chamber, the second chamber, and the flowpath.

In another exemplary embodiment, the housing has a first end, a second end, a plate, an inner surface, and a passage extending between the first and second ends. The plate is disposed in the passage and has a first side, a second side, and a passage formed therebetween. A first section of the housing inner surface and the plate first side define a first chamber having a volume, and a second section of the housing inner surface and the plate second side define a second chamber having a volume. The passage is configured to provide fluid communication between the first and second chambers. The first bellows is disposed within the housing first chamber and has a first end and a second end. The first bellows first end is coupled to the housing first end, and the first bellows second end has a surface. The second bellows is disposed within the housing second chamber and has a first end, a second end, and an inner surface. The second bellows first end is coupled to the housing second end and the second bellows inner surface defines a cavity therein. The piston is disposed within the housing passage and has a shaft having a first section, a second section and an outer surface. The shaft first section is at least partially disposed in the second bellows cavity, and the shaft second section is at least partially disposed outside of the second bellows cavity. At least a portion of the shaft outer surface of the second section coupled to the second bellows second end. The piston is configured to selectively receive a force to thereby move the piston through the housing passage to thereby increase the first chamber volume and decrease the second chamber volume or decrease the first chamber volume and increase the second chamber volume. Fluid is disposed within the first chamber, the second chamber, and the flowpath.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. While the isolation struts are discussed with reference to exemplary embodiments, any one of numerous other embodiments of a fluid filled isolation strut may be implemented as well. Fluid, as used in the present invention, can be any viscous liquid or any gas known in the art. Furthermore, there is no intention to be bound by any theory presented in the preceding background of the invention or the following detailed description of the invention.

Figure 1:
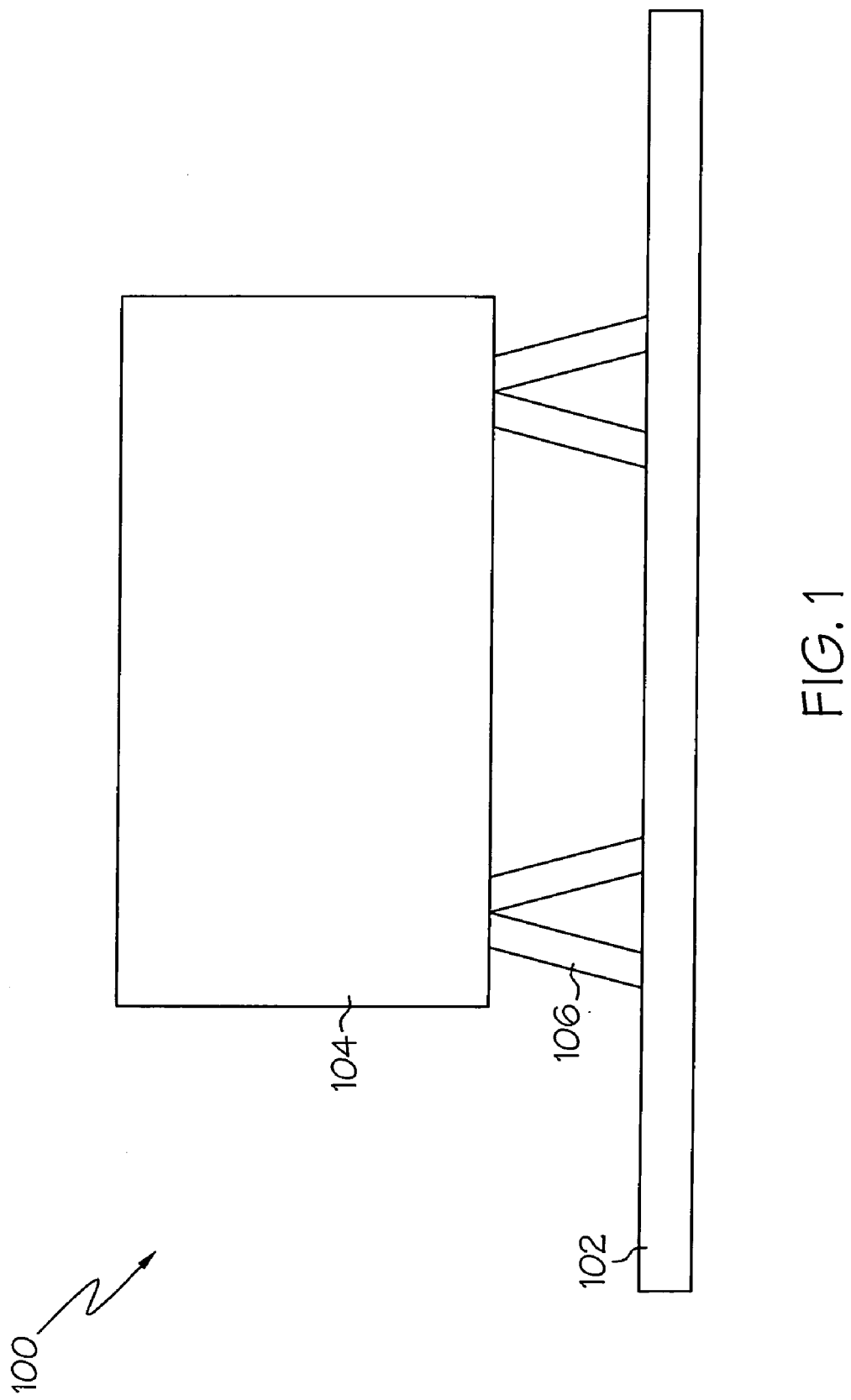
FIG. 1 is a schematic of an exemplary system having vibration damping and isolation.

FIG. 1 illustrates an exemplary system having vibration damping and isolation. The system 100 may be implemented in any one of numerous environments, such as in space, terrestrially, or under water. The system 100 includes a base 102, a payload 104, and at least one vibration isolation apparatus 106. The base 102 is configured to provide a platform to which the payload 104 and vibration isolation apparatus 106 are coupled and may be any one of numerous application-appropriate devices. For example, in a space application, the base 102 can be a satellite, an arm of a satellite, a space station, or any one of numerous other conventionally-used space apparatus. The payload 104 is a device that preferably needs vibration damping and isolation to operate effectively. The payload 104 may be any one of numerous devices, such as, for example, a telescope or a camera.

The vibration isolation apparatus 106 dampens and isolates vibration that may be experienced by the payload 104 and thus, is coupled between the payload 104 and the base 102. Although a single vibration isolation apparatus 106 may be used, it may be preferable to employ more than one vibration isolation apparatus 106. In one exemplary embodiment, three vibration isolation apparatus 106 are used in a tripod configuration to isolate vibration in three axes of vibration. In another exemplary embodiment, six vibration isolation apparatus 106 are implemented in a hexapod configuration to provide vibration isolation in six degrees of freedom. In still another exemplary embodiment, eight vibration isolation apparatus 106 are employed to isolation vibration in eight axes of vibration.

Figure 2:
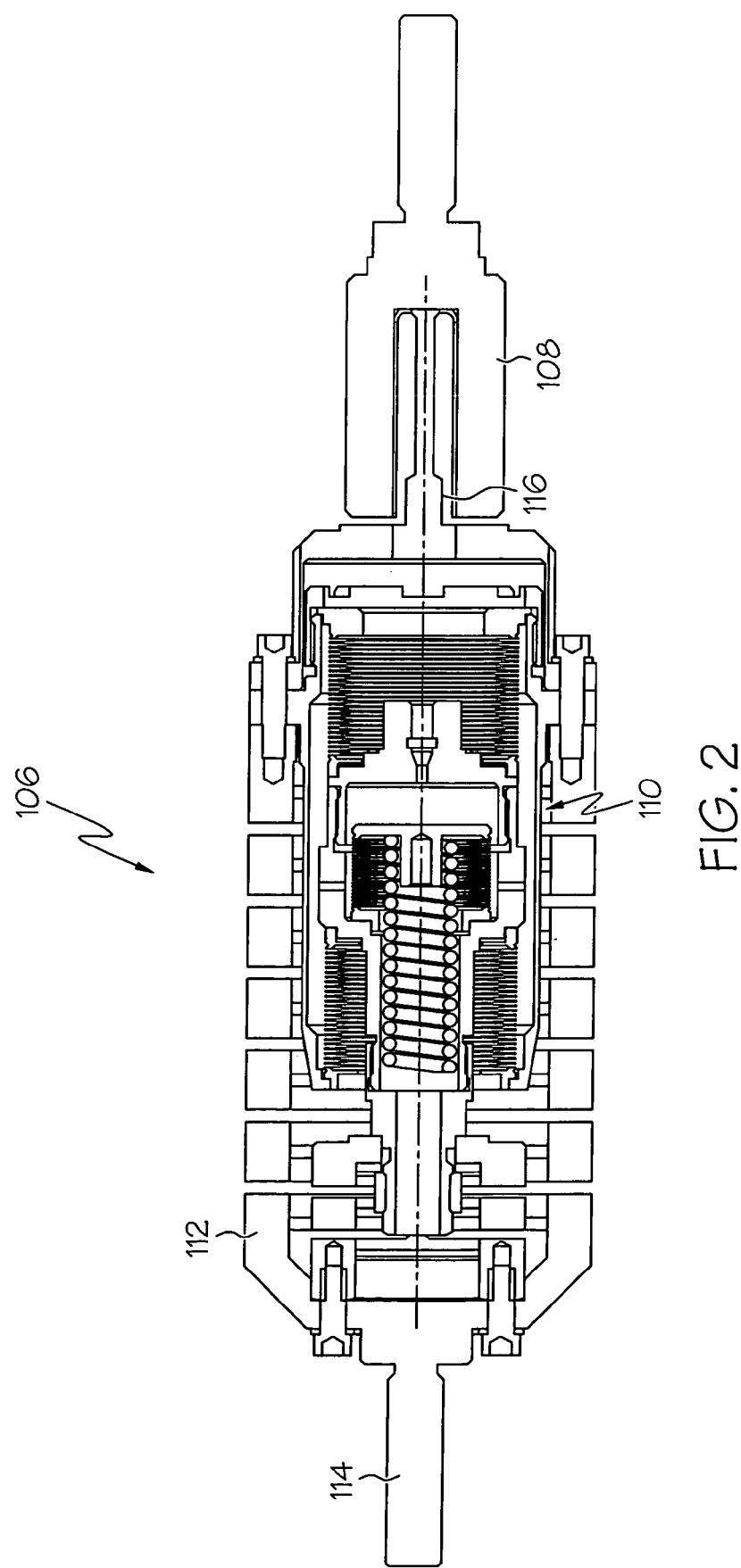
FIG. 2 is a cross section view of an exemplary isolator that may be implemented in the system depicted in FIG. 1.

With reference now to FIG. 2, one exemplary vibration isolation apparatus 106 is provided. The vibration isolation apparatus 106 includes a pivot 108, an isolation assembly 110, an outer housing 112, and a support 114. The pivot 108 receives vibratory motion from the payload 104 and couples the payload 104 to the vibration isolation apparatus 106. The isolation assembly 110 damps and isolates the received vibratory motion and is coupled to the pivot 108 via a pivot 116. The outer housing 112 protects the isolation assembly 110 from damage and is configured to house the isolation assembly 110 therein. The support 114 attaches the vibration isolation apparatus 106 to the base 102 and may be either integrally formed as part of the outer housing 112 or may be a separate piece coupled to the outer housing 112. Although the support 114 is illustrated as being on an opposite end of the isolation assembly 110 from the pivot 108, it will be appreciated that the support 114 may be formed on or coupled to any suitable part of the isolation assembly 110.

Figure 3:
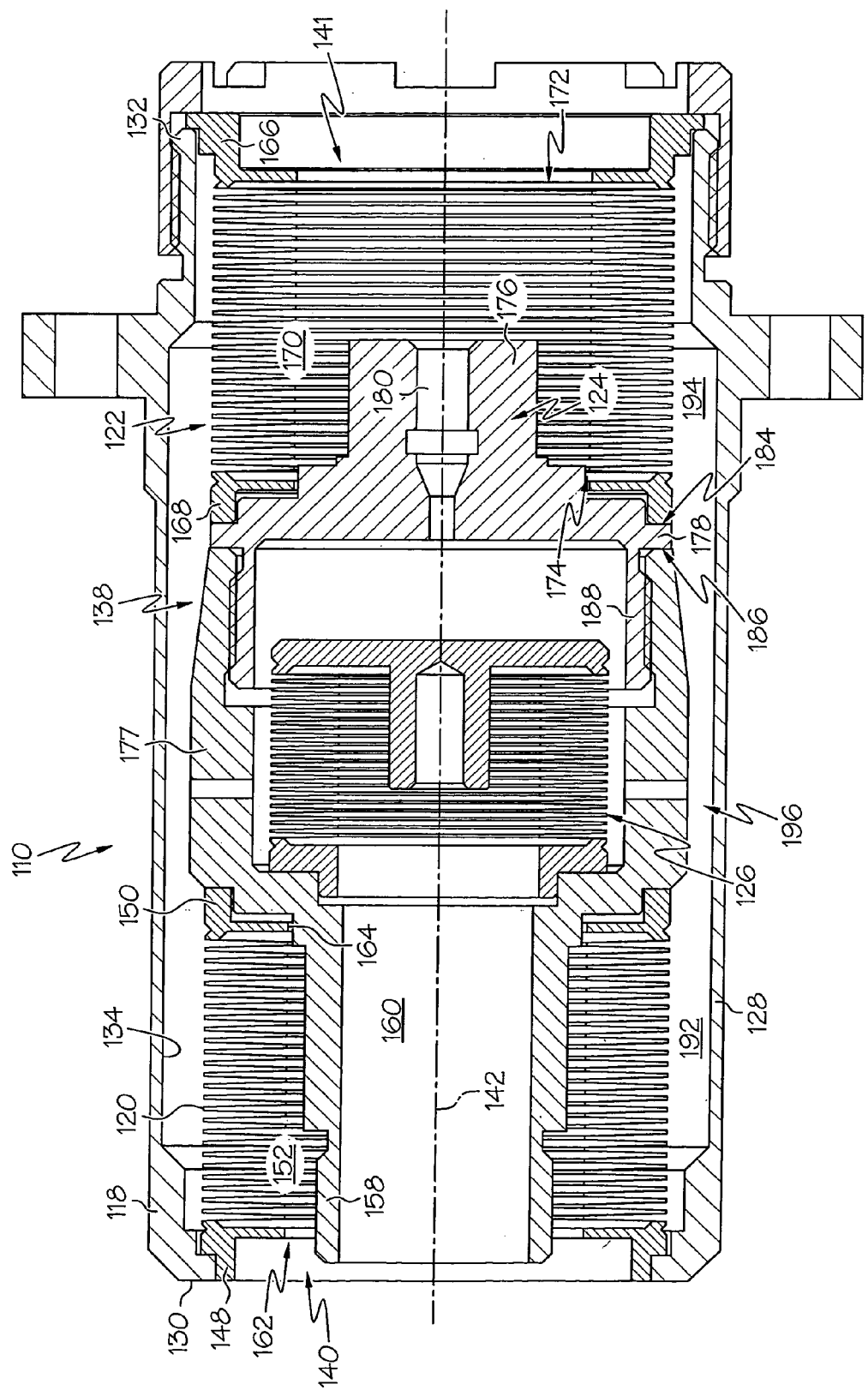
FIG. 3 is a close up view of a section of the exemplary isolator depicted in FIG. 2.

Turning now to FIG. 3, a cross section view of an exemplary isolation assembly 110 is depicted. The isolation assembly 110 includes an assembly housing 118, a first bellows 120, a second bellows 122, a piston assembly 124, fluid and, optionally, a temperature compensation device 126. The assembly housing 118 is configured to operate with the other components of the isolation assembly 110 to provide a fixed volume of space and to enclose and seal the fluid therein. The assembly housing 118 includes at least a tube 128 that has a first end 130, a second end 132, and an inner surface 134 that defines a passage 138 extending between the first and second ends 130, 132. The assembly housing 118 also includes a longitudinal axis 142 along which the components in the passage 138 may travel. Preferably, the first end 130 includes an inlet 140, the second end 132 includes an outlet 141, and the tube 128 has no openings other than the inlet 140 and outlet 141. However, in alternate embodiments, the tube 128 may be a single component having endwalls integrally formed or coupled to each of the first and second ends 130, 132.

Figure 4:
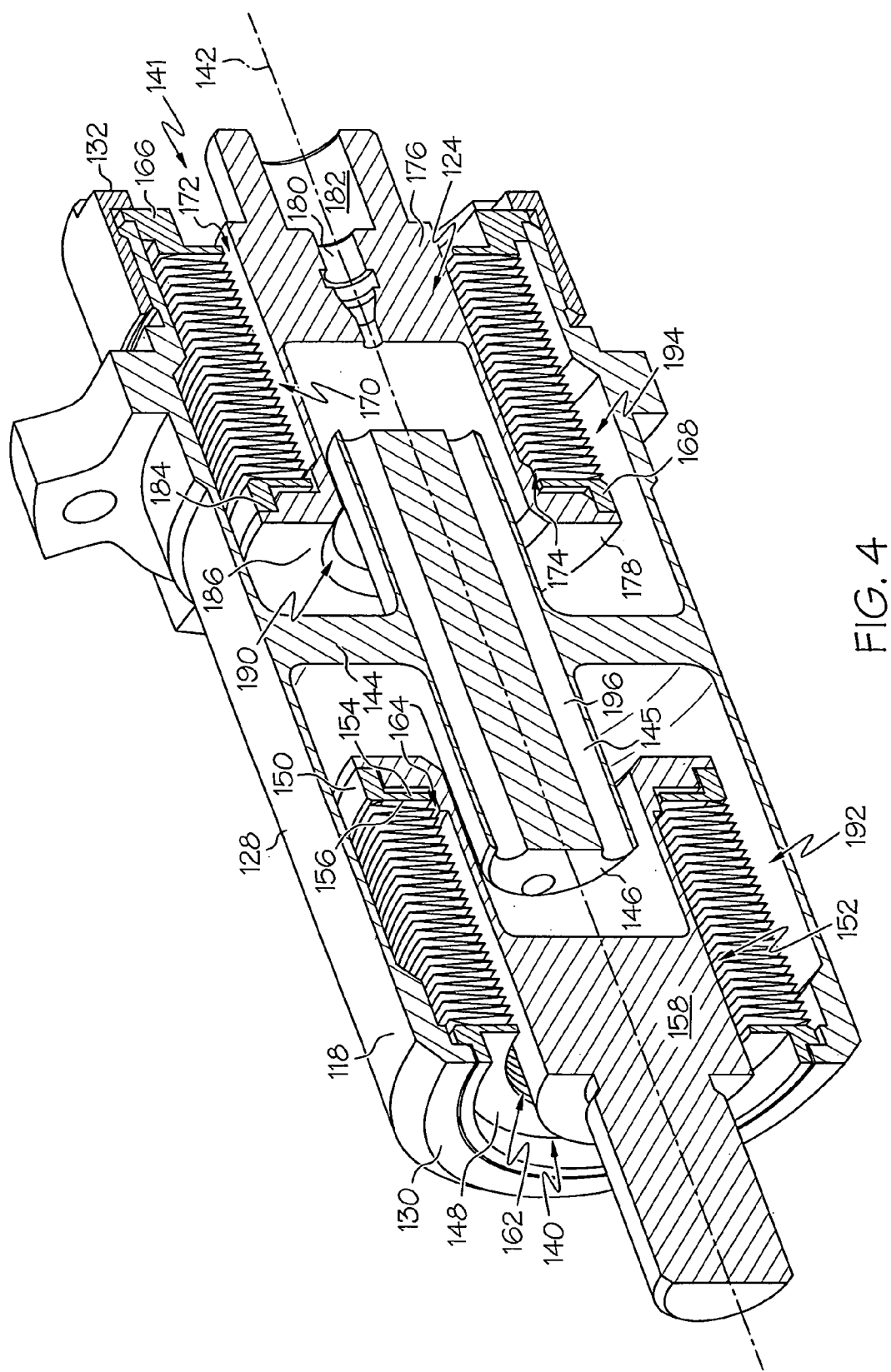
FIG. 4 is a cross section view of another exemplary isolator that may be implemented in the system depicted in FIG. 1.

In one exemplary embodiment, such as illustrated in FIG. 4, the assembly housing 118 includes a damping plate 144 disposed in the middle thereof. The damping plate 144 is integrally formed or integrated as part of the assembly housing 118 and includes at least one duct 145 that extends through the damping plate 144. The damping plate 144 can include a pipe 146 that extends axially outward from substantially the center of each side of the damping plate 144 along the longitudinal axis 142. In such an embodiment, the ducts 145 also extend through the pipe 146.

Returning to FIG. 3, the first bellows 120 is disposed within the assembly housing 118 and is preferably configured to move along the longitudinal axis 142. The first bellows 120 is coupled at one end to a first end plate 148 and at an opposite end to a second end plate 150 to thereby define first bellows interior cavity 152 therebetween. The first end plate 148 sealingly mates with the assembly housing first end 130 and couples the first bellows 120 thereto. The second end plate 150 couples to a support shaft 158 that is disposed within the first bellows interior cavity 152.

The support shaft 158 is configured to provide structural support for the first bellows 120 and guides the first bellows 120 along the longitudinal axis 142 during operation. The support shaft 158 may itself include a cavity 160 configured to receive other isolation assembly 110 components therein. It will be appreciated that each of the first and second end plates 148, 150 include openings 162, 164 formed therein that are configured to accommodate components that may extend outside of the assembly housing 118, such as the temperature compensation device 126, shown in FIG. 3, the damping plate pipe 146, illustrated in FIG. 4, or support shaft 158.

Similar to the first bellows 120, the second bellows 122 is disposed within the assembly housing 118, is coupled to a first and a second end plate 166, 168, and is preferably configured to move along the longitudinal axis 142. Although depicted in FIG. 3 as being capable of traveling along the same axis 142 as the first bellows 120, it will be appreciated that in other non-illustrated embodiments the second bellows 122 may move along any other suitable axis. The second bellows first end plate 166 sealingly mates with the assembly housing second end 132 and couples the second bellows 122 thereto. The second bellows second end plate 168 is coupled to the opposite end of the second bellows 122 and, together with the first end plate 166 and inner surface of the second bellows 122, defines a interior cavity 170. Just as above, each of the first and second end plates 166, 168 include openings 172, 174 formed therein that are configured to provide space for disposal of components that may extend outside of the assembly housing 118, in this case, the piston assembly 124 or pivot 116 (shown in FIG. 2).

The piston assembly 124 is configured to operate with the first and second bellows 120, 122 to damp and isolate vibration received from the pivot 116 (shown in FIG. 2). The piston assembly 124 is disposed within the assembly housing 118 and is coupled between the first and second bellows 120, 122. The piston assembly 124 includes a piston shaft 176 and piston flange 178. The piston shaft 176 may be a single or multiple pieces (for example, shaft 176 and section 177, as shown in FIG. 3) and is aligned along the longitudinal axis 142 and is disposed in the second bellows interior cavity 170. The piston shaft 176 has an end that is coupled to the pivot 116 and another end that is coupled to the piston flange 178. In one exemplary embodiment, the piston shaft 176 extends through the second end plate opening 174 of the second bellows 122 and is coupled directly to the pivot 116. It will be appreciated, however, that the piston shaft 176 may be coupled to the pivot 116 in any other suitable manner to receive vibratory motion therefrom.

The piston shaft 176 includes a flowpath 180 extending at least partially therethrough for receiving fluid. In one exemplary embodiment, one section of the flowpath 180 has threaded walls that are configured to mate with a set screw. In embodiments in which the damping plate pipe 144 is employed, such as in FIG. 4, the piston shaft 176 includes an alcove 182. The alcove 182 fluidly communicates with the flowpath 180 and is configured to receive the damping plate pipe 144.

The piston flange 178 extends radially outward from the piston shaft 176 and may be either formed integrally as part of the piston shaft 176 or may be separately constructed and subsequently attached to the piston shaft 176. The piston flange 178 includes a inner surface 184 and an outer surface 186. The inner surface 184 is sealingly coupled to the second bellows second end plate 168. The outer surface 186 may have any one of numerous configurations. However, in the embodiment shown in FIG. 3, the outer surface 186 is coupled to the first bellows 120 via another section of the piston 177. As such, the outer surface 186 includes an extension 188 that mates with the piston section 177. The piston section 177, in turn, is coupled to the first bellows second end plate 150. In another exemplary embodiment, the outer surface 186 is configured to couple to the first bellows 120 and the outer surface 186 is directly coupled to the first bellows second end plate 150. In still another exemplary embodiment, the outer surface 186 is not coupled to the first bellows 120. Instead, as shown in FIG. 4, the piston flange 178 includes an opening 190 formed therethrough that fluidly communicates with the alcove 182. In embodiments in which the damping plate 144 is included and the ducts 145 are formed in the damping plate pipe 146, both the piston flange opening 190 and alcove 182 are configured to accommodate the damping plate pipe 146.

As briefly mentioned previously, the isolator assembly 110 components are preferably configured to operate together to sealingly enclose the fluid therein in a fixed volume of space. The volume of space is separated into subvolumes, each of which is disposed in a first chamber 192, a second chamber 194, and a restrictive flow passage 196. The first chamber 192 is defined by a portion of the assembly housing inner surface 134 and an outer surface of the first bellows 120, and the second chamber 194 is defined by another portion of the assembly housing inner surface 134 and an outer surface of the second bellows 122. In another exemplary embodiment, such as shown in FIG. 4, the second chamber 194 is defined by a portion of the assembly housing inner surface 134, an outer surface of the second bellows 122, and the piston assembly alcove 182. The restrictive flow passage 196 allows the first and second chambers 192, 194 to communication with one another and may have any one of numerous configurations. In one exemplary embodiment, a damping annulus 196, defined by the piston flange 178 and assembly housing inner surface 134, acts as the restrictive flow passage. In another exemplary embodiment, the restrictive flow passage 196 is defined by the ducts 145 that are formed in the damping plate pipe 146, as shown in FIG. 4. In still another embodiment, the restrictive flow passage 196 is defined by ducts 145 formed in the damping plate 144. No matter the particular configuration, the first chamber 192, second chamber 194, and restrictive flow passage(s) 196 are filled with fluid. Thus, during the operation of the isolation assembly 110, when a force is exerted on the piston assembly 124, fluid is pushed from the second chamber 194, through the restrictive flow passage 196, into the first chamber 192.

As illustrated in FIG. 3, the temperature compensation device 126 may be included in the isolation assembly 110 to compensate for fluid expansion and/or contraction in response to temperature changes. The temperature compensation device 126 may have any one of numerous suitable configurations and may be disposed within the isolation assembly 110 in any one of numerous manners.

There has now been provided a vibration isolator that does not experience column buckling. For example, during operation, the isolation strut is capable of transmitting fluid pressure from its moving piston to the sealed bellows outer surfaces, thereby reducing the possibility of column buckling of the sealed bellows. Additionally, the vibration isolator is capable of withstanding high damping forces in conjunction with the use of a small bellows cross sectional area. In some embodiments, the components of the vibration isolator are located in the bellows interior cavities, thereby allowing the overall length of the vibration isolator to be shorter than conventional vibration isolators. In addition, the isolation strut is capable of being implemented in any type of space constraint. For example, the isolator may still be able to effectively dampen a structure while having a smaller overall diameter than conventional isolators because its damping capabilities are not limited by its sealed bellows cross-sectional area and/or the restrictive passage through which fluid flows may be lengthened to any suitable length.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A damping system, comprising:
   a housing having an inner surface defining a passage therethrough;
   a first bellows disposed within the housing passage, the first bellows having an outer surface and spaced apart from the housing inner surface to define a first chamber having a volume;
   a second bellows disposed within the housing passage, the second bellows having an outer surface and spaced apart from the housing inner surface to define a second chamber having a volume;
   a restrictive flow passage in fluid communication with the first and second chambers;
   fluid disposed within the first chamber the second chamber, and the restrictive flow passage; a piston coupled to at least the second bellows and disposed within the housing passage, the piston configured to selectively receive a force to thereby move the piston through the restrictive flow passage to increase the first chamber volume and decrease the second chamber volume or to decrease the first chamber volume and increase the second chamber volume; and
   a temperature compensator bellows coupled between the first bellows and the piston, the temperature compensator bellows configured to compensate for expansion and contraction of the fluid during temperature changes.

2. The damping system of claim 1, wherein the piston has an outer surface and the restrictive flow passage is defined by the piston outer surface and a portion of the housing inner surface.

3. The damping system of claim 2, wherein the piston is coupled to the first bellows.

4. The damping system of claim 1, wherein the second bellows has a second end and an inner surface defining a cavity therein, the piston has a shaft having a first section, a second section, and an outer surface, the shaft first section disposed at least partially in the second bellows cavity, the shaft second section disposed outside of the second bellows cavity, and at least a portion of the shaft outer surface between the first and second sections coupled to the second bellows second end.

5. The damping system of claim 1, wherein the fluid comprises at least one of a gas and a liquid.

6. An isolator system comprising:
   a housing having a first end, a second end, an inner surface, and a passage defined by the inner surface extending between the first and second ends;
   a first bellows disposed within the housing passage and having a first end, a second end, and an outer surface, the first bellows first end coupled to the housing first end, the first bellows second end having a surface, and the first bellows outer surface and housing inner surface defining a first chamber having a volume;
   a second bellows disposed within the housing passage and having a first end, a second end, an inner surface, and an outer surface, the second bellows first end coupled to the housing second end, the second bellows inner surface defining a cavity therein, and the second bellows outer surface and housing inner surface defining a second chamber having a volume;
   a piston disposed within the housing passage, the piston having a shaft having a first section, a second section and an outer surface, the shaft first section at least partially disposed in the second bellows cavity, the shaft second section at least partially disposed outside of the second bellows cavity and defining a flowpath with the housing inner surface, the flowpath in fluid communication between the first and second chambers, at least a portion of the shaft outer surface between the first and second sections coupled to at least the second bellows second end, the piston configured to selectively receive a force to thereby move the piston through the housing passage to increase the first chamber volume and decrease the second chamber volume or to decrease the first chamber volume and increase the second chamber volume;
   a temperature compensator bellows coupled between the first bellows and the piston, the temperature compensator bellows configured to compensate for expansion and contraction of the fluid during temperature changes: and
   fluid disposed at least within the first chamber, the second chamber, and the flowpath.

7. The isolator system of claim 6 wherein tile first bellows includes an inner surface that defines a channel and the temperature compensator bellows is disposed within the first bellows channel.

8. The isolator system of claim 6 wherein the first bellows includes an inner surface that defines a channel and the temperature compensator bellows includes a housing, the housing having a section disposed within the first bellows channel.

9. The isolator system of claim 6 wherein the fluid is a gas.

10. The isolator system of claim 6 wherein the fluid is a liquid.

11. An isolator system comprising:

a housing having a first end, a second end, a plate, an inner surface, and a passage extending between the first and second ends, the plate disposed in the passage and having a first side, a second side; and a passage formed therebetween, a first section of the housing inner surface and the plate first side defining a first chamber having a volume, a second section of the housing inner surface and the plate second side defining a second chamber having a volume, and the passage configured to provide fluid communication between the first and second chambers;

a first bellows disposed within the housing first chamber and having a first end, and a second end, the first bellows first end coupled to the housing first end, the first bellows second end having a surface;

a second bellows disposed within the housing second chamber and having a first end, a second end, and an inner surface, the second bellows first end coupled to the housing second end, the second bellows inner surface defining a cavity therein;

a piston disposed within the housing passage and spaced apart from the first bellows, the piston having a shaft having a first section, a second section and an outer surface, the shaft first section at least partially disposed in the second bellows cavity, the shaft second section at least partially disposed outside of the second bellows cavity, at least a portion of the shaft outer surface of the second section coupled to at least the second bellows second end, the piston configured to selectively receive a force to thereby move the piston through the housing passage to thereby increase the first chamber volume and decrease the second chamber volume or decrease the first chamber volume and increase the second chamber volume; and fluid disposed within the first chamber, the second chamber, and the flowpath.

12. The isolator system of claim 11, further comprising a temperature compensator bellows coupled to the first bellows, the temperature compensator bellows configured to compensate for expansion and contraction of the fluid during temperature changes.

13. The isolator system of claim 12, wherein the first bellows includes an inner peripheral surface that defines a channel and the temperature compensator bellows is disposed within the first bellows channel.

14. The isolator system of claim 12, wherein the first bellows includes an inner peripheral surface that defines a channel and the temperature compensator bellows includes a housing, the housing having a first section disposed within the first bellows channel and the second section having the bellows disposed therein.

15. The isolator system of claim 11, wherein the fluid comprises at least one of a gas and a liquid.

* * * * *

UNITED STATES PATENT AND TRADEMARK OFFICE
CERTIFICATE OF CORRECTION

PATENT NO. : 7,182,188 B2  Page 1 of 1
APPLICATION NO. : 11/059054
DATED : February 27, 2007
INVENTOR(S) : Dale T. Ruebsamen et al.

It is certified that error appears in the above-identified patent and that said Letters Patent is hereby corrected as shown below:

Column 7, line 57, "first chamber" should be changed to --first chamber,--;
Column 8, line 62, "tile" should be changed to --the--.

Signed and Sealed this

Twenty-second Day of May, 2007

JON W. DUDAS
*Director of the United States Patent and Trademark Office*